US009718482B2

(12) United States Patent
Abou Eid et al.

(10) Patent No.: US 9,718,482 B2
(45) Date of Patent: Aug. 1, 2017

(54) AIR CONDITIONING DEVICE FOR A COMPARTMENT, IN PARTICULAR FOR A RAILROAD VEHICLE

(71) Applicant: ALSTOM TRANSPORT TECHNOLOGIES, Levallois Perret (FR)

(72) Inventors: Rami Abou Eid, Paris (FR); Josselin Chan, Paris (FR); Philippe Chevalier, Rueil Malmaison (FR); Francis Mortreux, Maisons-Laffitte (FR)

(73) Assignee: ALSTON TRANSPORT TECHNOLOGIES, Levallois Perret (FR)

( * ) Notice: Subject to any disclaimer, the term of this patent is extended or adjusted under 35 U.S.C. 154(b) by 289 days.

(21) Appl. No.: 14/592,030

(22) Filed: Jan. 8, 2015

(65) Prior Publication Data

US 2015/0191182 A1    Jul. 9, 2015

(30) Foreign Application Priority Data

Jan. 8, 2014  (FR) ...................................... 14 50117

(51) Int. Cl.
*B61D 27/00*         (2006.01)
*F25B 7/00*          (2006.01)
(Continued)

(52) U.S. Cl.
CPC ............ *B61D 27/0018* (2013.01); *F25B 7/00* (2013.01); *F25B 41/04* (2013.01); *F25B 47/022* (2013.01);
(Continued)

(58) Field of Classification Search
CPC ...... B61D 27/0018; F25B 47/022; F25B 7/00; F25B 2400/24; F25B 2400/061; F25D 21/06
See application file for complete search history.

(56) References Cited

U.S. PATENT DOCUMENTS 2,707,869 A * 5/1955 Dennison .................. F25B 7/00
                                                   62/157
8,166,773 B2 * 5/2012 Immink .................... F25B 7/00
                                                   62/324.1

FOREIGN PATENT DOCUMENTS

EP   2 437 009       4/2012
JP   2001124419 A *  5/2001
JP   2002 327968     11/2002

OTHER PUBLICATIONS

French Search Report for FR 14 50117 dated Apr. 1, 2014.

\* cited by examiner

*Primary Examiner* — Emmanuel Duke
(74) *Attorney, Agent, or Firm* — B. Aaron Schulman, Esq.; Stites & Hardison, PLLC.

(57) ABSTRACT

An air conditioning device is provided which has a primary heat pump circuit having at least one primary heat exchanger with the air from the compartment, a primary compressor, a second primary heat exchanger with the outside air, and a primary expander device, and a heat storage reservoir, connected to the primary circuit, in parallel with said first primary heat exchanger with the air from the compartment. The air conditioning device also has a secondary heat pump circuit, including a first secondary heat exchanger with the air from the compartment, a secondary compressor, a second secondary heat exchanger with the air from the outside, and a secondary expander device. The heat storage reservoir is connected to the secondary circuit, in parallel with the first
(Continued)

secondary heat exchanger with the air from the compartment.

17 Claims, 1 Drawing Sheet

(51) Int. Cl.
    *F25D 21/06*         (2006.01)
    *F25B 41/04*         (2006.01)
    *F25B 47/02*         (2006.01)

(52) U.S. Cl.
    CPC ........ *F25D 21/06* (2013.01); *F25B 2400/061*
                (2013.01); *F25B 2400/24* (2013.01)

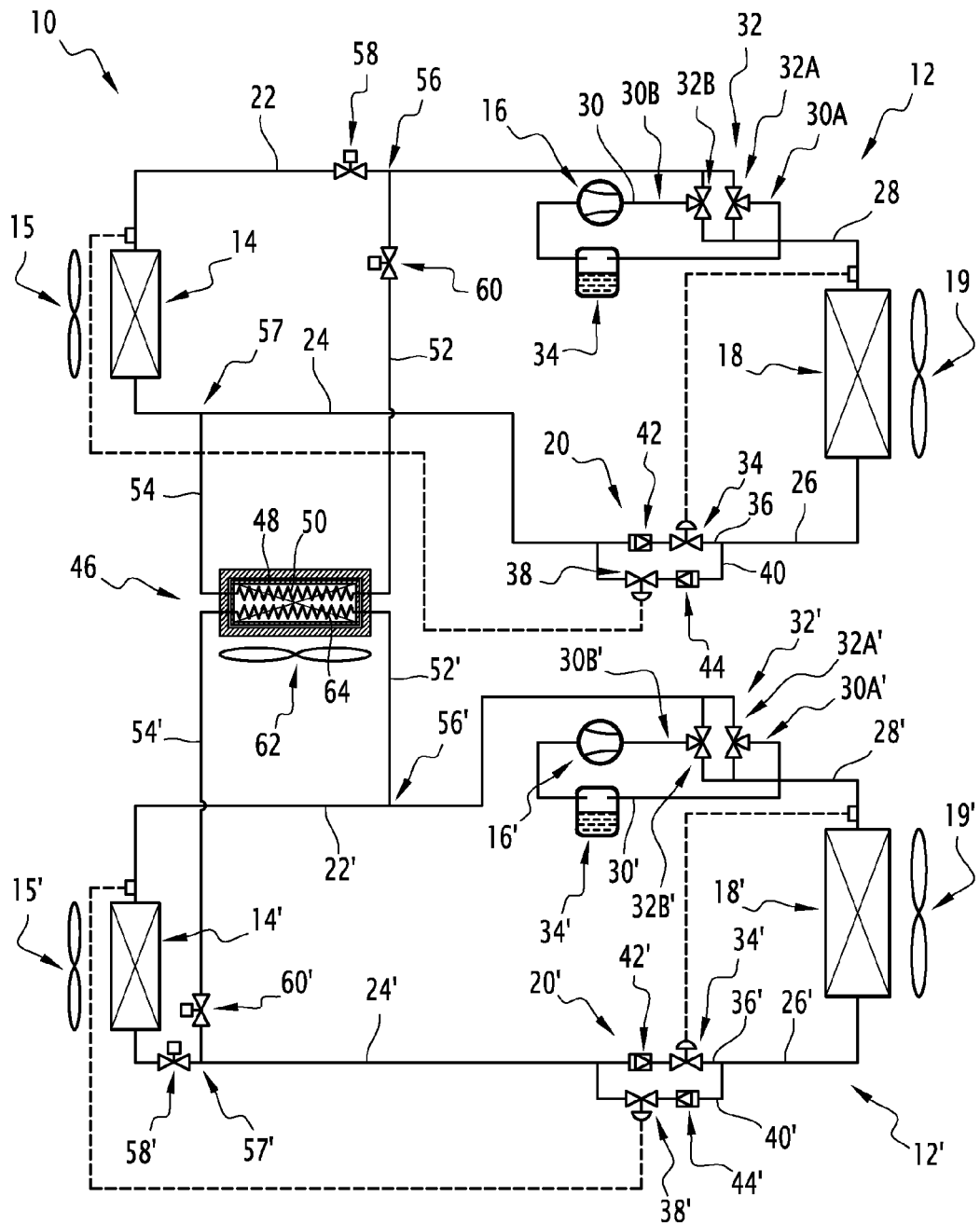

AIR CONDITIONING DEVICE FOR A COMPARTMENT, IN PARTICULAR FOR A RAILROAD VEHICLE

FIELD OF THE INVENTION

The present invention relates to an air conditioning device for a compartment, in particular for a railroad vehicle.

BACKGROUND OF THE INVENTION

A device is already known from the state of the art for air conditioning a compartment, comprising a heat pump circuit. Said heat pump circuit traditionally comprises a first heat exchanger with the air in the compartment, a compressor, a second heat exchanger with the outside air, and an expander, all arranged in series in a closed circuit to form a loop.

A refrigerant flows in that heat pump circuit and exchanges heat, on the one hand in the first heat exchanger, and on the other hand with the outside air in the second heat exchanger.

In order to allow an optimal heat exchange, each exchanger comprises fins increasing the air exchange surface.

Under certain climate conditions, the humidity contained in the outside air can be deposited on the fins of the second heat exchanger in the form of frost. That frost fills the spaces between the fins, then covers the second heat exchanger with a layer of frost that may hinder the passage of air. In that case, the performance of the heat pump circuit decreases considerably.

One known solution to provide defrosting of the second heat exchanger consists of reversing the cycle of the heat pump, such that the refrigerant withdraws heat from the first heat exchanger, and gives heat to the second heat exchanger in order to melt the frost.

When such defrosting is done, the thermal comfort inside the compartment can decrease, since the heat pump circuit takes heat from the compartment by means of the first heat exchanger. Thus, in order to maintain a comfortable temperature in the passenger compartment, electric heating is generally activated to offset that heat withdrawal.

Such electric heating consumes quite a bit of energy, with the result that the solution is not very advantageous.

Other known solutions for defrosting the second heat exchanger are also known. For example, one known solution provides a heat storage reservoir connected to the heat pump circuit, designed to favor defrosting. In that case, heat is taken from the heat storage reservoir rather than the air in the compartment. However, the compartment is nevertheless heated very little during defrosting, which can cause a decrease in thermal comfort in compartment. Furthermore, such a device generally requires oversized components to have satisfactory operation. Thus, such a solution is also not very advantageous.

BRIEF SUMMARY OF THE INNVENTION

The invention in particular aims to resolve these drawbacks, by providing an air conditioning device allowing defrosting of the outside heat exchanger without reducing the thermal comfort in the compartment, and without requiring the use of additional electric heating.

To that end, the invention in particular relates to an air conditioning device for a compartment, in particular for a railroad vehicle, of the type comprising:

a primary heat pump circuit, comprising at least one primary heat exchanger with the air from the compartment, a primary compressor, a second primary heat exchanger with the outside air, and a primary expander device, and a heat storage reservoir, connected to the primary circuit, in parallel with said primary heat exchanger with the air from the compartment, characterized in that:

the air conditioning device comprises a secondary heat pump circuit, comprising a first secondary heat exchanger with the air from the compartment, a secondary compressor, a second secondary heat exchanger with the air from the outside, and a secondary expander device, the heat storage reservoir is connected to the secondary circuit, in parallel with said first secondary heat exchanger with the air from the compartment.

Owing to the two heat pump circuits, both connected to the heat storage reservoir and working independently, it is possible to provide many advantageous operating modes.

In particular, it is possible to defrost the second heat exchanger of one of the heat pump circuits by withdrawing heat from the heat storage reservoir rather than from the air in the compartment, while continuing to heat the air of the compartment using the other heat pump circuit.

Furthermore, the heat storage reservoir can be recharged with heat by one of the heat pump circuits, while the other heat pump circuit performs heating of the compartment. Thus, the presence of the heat storage reservoir has no impact on the thermal comfort inside the compartment.

The presence of at least two heat pump circuits also allows other advantageous operating modes, which will be described in detail later.

An air conditioning device according to the invention can further comprise one or more of the following features, considered alone or in any technically possible combinations:

The heat storage reservoir comprises: —an enclosure filled with a heat storage fluid, —a first hollow heat exchange element, housed in the enclosure, and communicating with the primary heat pump circuit, and —a second hollow heat exchange element, housed in the enclosure, and communicating with the secondary heat pump circuit.

At least one of the primary and secondary heat pump circuits comprises: —a first branch, connected to the first heat exchanger, —a second branch, extending between the first heat exchanger and the expander device, —a third branch, extending between the expander device and the second heat exchanger, —a fourth branch, connected to the second heat exchanger, —a compressor branch, on which the compressor is arranged, and extending between an inlet part and an outlet part, and —an inversion device, able to alternate between connecting said input part to said first branch and said output part to the fourth branch, or said inlet part to said fourth branch and said output part to the first branch.

At least one of the inversion devices comprises: —a first three-way valve, having a first path connected to said first branch, a second path connected to said inlet part, and a third path connected to said fourth branch, and —a second three-way valve, having a first path connected to said first branch, a second path connected to said outlet part, and a third path connected to said fourth branch.

At least one of the primary or secondary expander devices comprises first and second expanders, each supported by a first and second respective expander branch, such that: —the first expander has an inlet connected to said second branch, and an outlet connected the third branch, —the second expander has an inlet connected said third branch, and an outlet connected to said second branch, and —each expander branch comprises a check valve, arranged in series with the first or second corresponding expander, and oriented in the same direction as that first or second corresponding expander.

The first hollow heat exchange element is connected on the one hand to said first branch of the primary heat pump circuit by means of a first primary conduit, and on the other hand to said second branch of the primary heat pump circuit by means of the second primary conduit, and the second hollow heat exchange element is connected on the one hand to said first branch of the secondary heat pump circuit by means of a first secondary conduit, and on the other hand said second branch of the secondary heat pump circuit by means of a second secondary conduit.

The first primary conduit is connected to the first branch of the primary circuit at a first primary branching, the second primary conduit is connected to the second branch of the primary circuit at a second primary branching, the first or second branch of the primary circuit comprises a first primary valve arranged between said first or second primary branching and the first primary exchanger, and the first or second primary conduit comprises a second primary valve.

The first secondary conduit is connected to the first branch of the secondary circuit at a first secondary branching, the second secondary conduit is connected to the second branch of the secondary circuit at a second secondary branching, the first or second branch of the secondary circuit comprises a first secondary valve, arranged between said first or second secondary branching, and the first secondary exchanger, and the first or second secondary conduit, comprises a second secondary valve.

Said heat storage reservoir is able to exchange heat with the air, in particular the air in the compartment, the heat storage reservoir preferably being equipped with a ventilation device able to generate a flow of air passing through the storage reservoir.

At least one of the first or second primary or secondary heat exchangers is equipped with a ventilation device able to generate a flow of air passing through that first or second primary or secondary heat exchanger.

The invention also relates to a method for defrosting the second heat exchanger of the primary or secondary heat pump circuit of an air conditioning device as previously defined, characterized in that:
the primary or secondary circuit, comprising the second heat exchanger to be defrosted, operates in a cold storage configuration, in which a refrigerant circulating in that circuit withdraws heat from the storage reservoir and gives that heat back to the second heat exchanger to be defrosted,
the other circuit operates in a heating configuration of the compartment, in which a refrigerant circulating in that circuit withdraws heat from the second heat exchanger of that circuit and gives that heat back to the first heat exchanger of that circuit.

Advantageously, said other circuit operates in a configuration for heating the compartment and storing heat in the storage reservoir, in which a refrigerant circulated in that circuit withdraws heat from the second heat exchanger of that circuit and gives the heat back on the one hand to the first heat exchanger of that circuit, and on the other hand to the storage reservoir.

BRIEF DESCRIPTION OF THE DRAWING FIGURE

The invention will be better understood upon reading the following description, provided solely as an example and done in reference to the appended FIGURE, diagrammatically showing an air conditioning device according to one example embodiment of the invention.

The FIGURE shows an air conditioning device 10 for a compartment, in particular for a railroad vehicle.

DETAILED DESCRIPTION OF EXEMPLARY EMBODIMENTS

In the present description, the term "compartment" covers any enclosed space that may be air conditioned, for example a travel compartment of a railroad vehicle, a control cab of a railroad vehicle, a motor vehicle passenger compartment, a compartment of an aeronautic or maritime vehicle, or a room of a building.

The air conditioning device 10 according to the invention comprises two heat pump circuits, i.e., a primary heat pump circuit 12 and a secondary heat pump circuit 12' that are similar.

The primary heat pump circuit 12 traditionally comprises a first primary heat exchanger 14 with the air from the compartment, a primary compressor 16, a second primary heat exchanger 18 with the outside air, and a primary expander device 20. A primary refrigerant circulates in that primary circuit 12.

Advantageously, the first primary heat exchanger 14 is equipped with a first primary ventilation device 15, able to generate a flow of air passing through that first primary heat exchanger 14. Likewise, the second primary heat exchanger 18 is equipped with a second primary ventilation device 19, able to generate a flow of air passing through that second primary heat exchanger 18. These ventilation devices favor the exchange of heat between the air and the corresponding heat exchanger.

This primary heat pump circuit 12 is advantageously reversible, i.e., it can be used to increase or lower the temperature in the compartment. In other words, the air in the compartment can form a hot source or a cold source of the heat pump, based on its operating mode.

Thus, the structure of the primary circuit 12, which will be described below, is suitable for such a reversible operation.

In particular, the primary circuit 12 comprises a first branch 22 connected to the first primary heat exchanger 14, a second branch 24 extending between the first primary heat exchanger 14 and the primary expander device 20, a third branch 26 extending between the primary expander device 20 and the second primary heat exchanger 18, and a fourth branch 28 connected to the second primary heat exchanger 18.

Furthermore, the primary circuit 12 comprises a primary compressor branch 30, on which the primary compressor 16 is arranged. This primary compressor branch 30 extends between an inlet part 30A and outlet part 30B. In fact, the primary refrigerant can only circulate in one direction in the primary compressor 16, therefore in only one direction of the primary compressor branch 30.

Thus, the primary circuit 12 comprises a primary inversion device 32, able to alternate between connecting said inlet portion 30A to the first branch 22 and said outlet portion 30B to the fourth branch 28, or said inlet part 30A to the fourth branch 28 and said outlet part 30B to the first branch 22. Thus, depending on the connection made by the primary inversion device 32, the primary refrigerant can circulate from the primary compressor 16 to the first primary heat exchanger 14 or from the primary compressor 16 to the second primary heat exchanger 18.

The primary inversion device 32 for example comprises:
a first three-way valve 32A, having a first path connected to said first branch 22, a second path connected to said inlet part 30A, and a third path connected to said fourth branch 28, and
a second three-way valve 32B, having a first path connected to said first branch 22, a second path connected to said outlet part 30B, and a third path connected to said fourth branch 28.

Thus, each of these first 32A and second 32B three-way valves is able to allow the fluid communication of the inlet part 30A, the outlet part 30B, respectively, with the first 22 or fourth 28 branch. These first 32A and second 32B valves are controlled such that, when the inlet part 30A is connected to one of the first 22 or fourth 28 branches, then the outlet part 30B is connected to the other of those first 22 or fourth 28 branches.

Advantageously, in a manner known in itself, the primary compressor branch 30 comprises a traditional buffer accumulator 34.

Furthermore, since an expander also only operates in a single refrigerant circulation direction, the primary expander device 20 also has a reversible structure.

In particular, the primary expander device 20 comprises a first primary expander 34 supported by a first expander branch 36, having inlet connected to the second branch 24 and an outlet connected to the third branch 26, and a second primary expander 38, supported by a second expander branch 40, parallel to the first expander branch 36, said second primary expander 38 having an inlet connected to said third branch 26 and an outlet connected to said second branch 24.

Furthermore, each expander branch 36, 40 advantageously comprises a respective check valve 42, 44, arranged in series with the first 34 or second 38 corresponding primary expander, and oriented in the same direction as that first 34 or second 38 corresponding primary expander.

Thus, depending on the circulation direction of the refrigerant imposed by the compressor 16, that refrigerant passes through either of the first 36 and second 40 expander branches.

According to the described embodiment, a heat storage reservoir 46 is connected to the primary circuit 12, in parallel with said first primary heat exchanger 14.

More particularly, the heat storage reservoir 46 comprises an enclosure 48 filled with a heat storage fluid, in particular liquid, and a first hollow heat exchange element 50, housed in the enclosure 48, and communicating with the primary heat pump circuit 12.

To that end, the first hollow element 50 is connected on the one hand to said first branch 22 of the primary circuit 12 by means of a first primary conduit 52, and on the other hand to said second branch 24 of the primary circuit 12 by means of a second primary conduit 54.

The first primary conduit 52 is connected to the first branch 22 at a first primary branching 56, and the second primary conduit 54 is connected to the second branch 24 at a second primary branching 57.

In order to authorize the circulation of refrigerant toward one, the other or both of the first primary heat exchanger 14 and the heat storage reservoir 46, the first branch 22 comprises a first primary valve 58, in particular a solenoid valve, arranged between said first primary branching 56 and the first heat exchanger 14, and the first primary conduit 52 comprises a second primary valve 60, in particular a solenoid valve.

Advantageously, the heat storage reservoir 46 is housed in a compartment, and is able to exchange heat with the air in a compartment. Preferably, the heat storage reservoir 46 is equipped with a ventilation device 62, able to generate a flow of air passing through that heat storage reservoir 46, in order to favor the exchange of heat between the air of the compartment [and] that heat storage reservoir 46.

The secondary heat pump circuit 12' will now be described below.

The secondary heat pump circuit 12' traditionally comprises a first secondary heat exchanger 14' with the air from the compartment, a secondary compressor 16', a second secondary heat exchanger 18' with the outside air, and a secondary expander device 20'. A secondary refrigerant circulates in that secondary circuit 12'.

Advantageously, the first secondary heat exchanger 14' is equipped with a first secondary ventilation device 15', able to generate a flow of air passing through that first secondary heat exchanger 14'. Likewise, the second secondary heat exchanger 18' is equipped with a second secondary ventilation device 19', able to generate a flow of air passing through that second secondary heat exchanger 18'. These ventilation devices favor the exchange of heat between the air and the corresponding heat exchanger.

This secondary heat pump circuit 12' is advantageously reversible, i.e., it can be used to increase or lower the temperature in the compartment. In other words, the air in the compartment can form a hot source or a cold source of the heat pump, based on its operating mode.

Thus, the structure of the secondary circuit 12', which will be described below, is suitable for such a reversible operation.

In particular, the secondary circuit 12' comprises a first branch 22' connected to the first secondary heat exchanger 14', a second branch 24' extending between the first secondary heat exchanger 14' and the secondary expander device 20', a third branch 26' extending between the secondary expander device 20 and the second secondary heat exchanger 18, and a fourth branch 28' connected to the second secondary heat exchanger 18'.

Furthermore, the secondary circuit 12' comprises a secondary compressor branch 30', on which the secondary compressor 16' is arranged. This secondary compressor branch 30' extends between an inlet part 30A' and outlet part 30B'. In fact, the primary refrigerant can only circulate in one direction in the secondary compressor 16', therefore in only one direction of the secondary compressor branch 30'.

Thus, the secondary circuit 12' comprises a secondary inversion device 32', able to alternate between connecting said inlet portion 30A' to the first branch 22' and said outlet portion 30B' to the fourth branch 28', or said inlet part 30A' to the fourth branch 28' and said outlet part 30B' to the first branch 22'. Thus, depending on the connection made by the secondary inversion device 32', the secondary refrigerant can circulate from the secondary compressor 16' to the first secondary heat exchanger 14' or from the secondary compressor 16' to the second secondary heat exchanger 18'.

The secondary inversion device 32' for example comprises:
- a first three-way valve 32A', having a first path connected to said first branch 22', a second path connected to said inlet part 30A', and a third path connected to said fourth branch 28', and
- a second three-way valve 32B', having a first path connected to said first branch 22', a second path connected to said outlet part 30B', and a third path connected to said fourth branch 28'.

Thus, each of these first 32A' and second 32B' three-way valves is able to allow the fluid communication of the inlet part 30A', the outlet part 30B', respectively, with the first 22' or fourth 28' branch. These first 32A' and second 32B' valves are controlled such that, when the inlet part 30A' is connected to one of the first 22' or fourth 28' branches, then the outlet part 30B is connected to the other of those first 22' or fourth 28' branches.

Advantageously, in a manner known in itself, the secondary compressor branch 30' comprises a traditional buffer accumulator 34'.

Furthermore, since an expander also only operates in a single refrigerant circulation direction, the secondary expander device 20' also has a reversible structure.

In particular, the secondary expander device 20' comprises a first secondary expander 34' supported by a first expander branch 36', having inlet connected to the second branch 24' and an outlet connected to the third branch 26', and a second secondary expander 38', supported by a second expander branch 40', parallel to the first expander branch 36', said second secondary expander 38' having an inlet connected to said third branch 26' and an outlet connected to said second branch 24'.

Furthermore, each expander branch 36', 40' advantageously comprises a respective check valve 42', 44', arranged in series with the first 34' or second 38' corresponding secondary expander, and oriented in the same direction as that first 34' or second 38' corresponding secondary expander.

Thus, depending on the circulation direction of the refrigerant imposed by the secondary compressor 16', that refrigerant passes through either of the first 36' and second 40' expander branches.

According to the described embodiment, a heat storage reservoir 46 is also connected to the secondary circuit 12', in parallel with said first secondary heat exchanger 14'.

More particularly, the heat storage reservoir 46 [comprises] a second hollow heat exchange element 64, housed in the enclosure 48, and communicating with the secondary heat pump circuit 12'.

To that end, the second hollow element 64 is connected on the one hand to said first branch 22' of the secondary circuit 12' by means of a first secondary conduit 52', and on the other hand to said second branch 24' of the secondary circuit 12 by means of a second secondary conduit 54'.

The first secondary conduit 52' is connected to the first branch 22' at a first secondary branching 56', and the second secondary conduit 54' is connected to the second branch 24' at a second secondary branching 57'.

In order to authorize the circulation of refrigerant toward one, the other or both of the first secondary heat exchanger 14' and the heat storage reservoir 46, the second branch 24' comprises a first secondary valve 58', in particular a solenoid valve, arranged between said first secondary branching 57' and the first secondary heat exchanger 14', and the first primary conduit 54' comprises a second secondary valve 60', in particular a solenoid valve.

Different operating embodiments of the air conditioning device 10 according to the invention will now be described.

We will first describe the different operating configurations of each heat pump circuit 12, 12'. More particularly, we will describe the different operating configurations of the primary circuit 12, the operating configurations of the secondary circuit 12 being identical.

A first operating configuration of the circuit 12 is a configuration for heating the compartment.

In this heating configuration, the inversion device 32 is commanded to connect the inlet part 30A of the compressor branch 30 to the fourth branch 28 and the outlet part 30B of the compressor branch 30 to the first branch 22.

Furthermore, the first solenoid valve 58 is open to allow the passage of refrigerant from the compressor 16 to the first heat exchanger 14.

Conversely, the second solenoid valve 60 is closed to prevent the circulation of the refrigerant toward the heat storage reservoir 46.

Thus, in this heating configuration, the circuit 12 operates as a traditional heat pump. In fact, in a manner known in itself, the refrigerant leaves the compressor 16 hot, then circulates through the first branch 22 up to the first heat exchanger 14, where the refrigerant gives heat to the air in the compartment.

The refrigerant next circulates through the second branch 24, then through the expander branch 36 corresponding to that circulation direction, where the refrigerant is again cooled when its pressure decreases in the expander 34.

The refrigerant next circulates, through the third branch 26, up to the second heat exchanger 18 to take heat from the outside area. The refrigerant fluid then heated next circulates in the fourth branch 28 of the compressor 16, in which it is compressed so as to increase its pressure, and therefore its temperature. The cycle then continues as previously described.

A second operating configuration of the circuit 12 is a configuration for heat storage in the heat storage reservoir 46.

In this heat storage configuration, the first solenoid valve 58 of the circuit 12 is closed, and the second solenoid valve 60 is open. Thus, the refrigerant leaving the compressor 16 circulates as far as the heat storage reservoir 46, where it gives heat to the heat storage liquid.

The operation of the circuit 12 in this storage configuration is similar to that of the heating configuration previously described, with the exception of the fact that the refrigerant gives its heat to the heat storage liquid rather than to the air in the compartment.

A third operating configuration of the circuit 12 is a heating and storage configuration.

In this third configuration, the first 58 and second 60 solenoid valves are open. Thus, the refrigerant leaving the compressor 16 separates into two distinct flows at the first branching 56, to circulate on the one hand up to the heat storage reservoir 46 and on the other hand up to the first heat exchanger 14.

Thus, part of the refrigerant leaving the compressor 16 circulates up to the heat storage reservoir 46, where it gives heat to the heat storage liquid, and another part of the refrigerant leaving the compressor 16 circulates as far as the first heat exchanger 14, where it gives heat to the air in the compartment.

In that case, the compartment is heated less than in the first heating configuration, and the reservoir is heated less than in the second heat storage configuration.

A fourth operating configuration of the circuit 12 is a configuration for cooling the air in the compartment. In fact, using the inversion device 32, the heat pump circuit 12 is reversible.

Thus, in this cooling configuration, the inversion device 32 is commanded so that the inlet part 30A of the compressor branch 30 is connected to the first branch 22 and the outlet part 30B of that compressor branch 30 is connected to the fourth branch 28.

In that case, the refrigerant leaving the compressor 16 circulates up to the second heat exchanger 18, where it gives heat to the outside air.

The refrigerant thus cooled next circulates through the third branch 26, then through the expander branch 40 corresponding to that operating direction, where the refrigerant is cooled again when its pressure decreases in the expander 38.

The refrigerant next circulates through the second branch 24 as far as the first heat exchanger 14, where it takes heat from the air in the compartment.

The refrigerant lastly circulates as far as the compressor 16, where a new cycle can begin.

A fifth operating configuration of the circuit 12 is a configuration for storing cold in the heat storage reservoir 46.

In this cold storage configuration, the first solenoid valve 58 of the circuit 12 is closed, and the second solenoid valve 60 is open. Thus, the refrigerant leaving the expander 38 circulates as far as the heat storage reservoir 46, where it takes heat from the heat storage liquid.

The operation of the circuit 12 in this cold storage configuration is similar to that of the cooling configuration previously described, with the exception of the fact that the refrigerant takes heat from the heat storage liquid rather than from the air in the compartment.

It should be noted that this fifth operating configuration can also be used to defrost the second heat exchanger 18. In fact, heat taken from the heat storage liquid can be given back to the second heat exchanger 18 to cause the frost to melt.

A sixth operating configuration of the circuit 12 is a cooling and cold storage configuration.

In this sixth configuration, the first 58 and second 60 solenoid valves are open. Thus, the refrigerant leaving the expander 38 separates into two separate flows at the second branching 57, to circulate on the one hand as far as the heat storage reservoir 46 and on the other hand as far as the first heat exchanger 14.

Thus, part of the refrigerant leaving the expander 38 circulates up to the heat storage reservoir 46, where it takes heat from the heat storage liquid, and another part of the refrigerant leaving the expander 38 circulates as far as the first heat exchanger 14, where it withdraws heat from the air in the compartment.

In that case, the compartment is cooled less than in the fourth cooling configuration, and the reservoir is cooled less than in the fifth cold storage configuration.

Different combinations of operating configurations of the primary 12 and secondary 12' circuits can be considered to define different operating modes of the air conditioning device 10.

A first operating mode of the air conditioning device 10 is used in case of extreme cold, when the need for heat in the compartment is high.

In this first embodiment, the primary 12 and secondary 12' circuits are both in their first heating configuration of the compartment. The two heat pump circuits 12 and 12' thus operate in parallel, thereby allowing more efficient heating than a single heat pump circuit.

A second embodiment of the air conditioning device is used when the demand for heat in the compartment is moderate.

In this second operating mode, only one of the two primary 12 or secondary 12' heat pump circuits is in the configuration for heating the compartment, and the other circuit is deactivated, in particular by closing its compressor.

In a third operating mode, only one of the circuits 12, 12' operates in the configuration for heating the compartment, as in the second embodiment, and the other circuit operates in the second heat storage configuration.

This third operating mode is preferred to the second operating mode when the demand for heat in the compartment is the same, but one wishes to store heat in the reservoir 46.

Alternatively, in a fourth embodiment, only one of the circuits 12, 12' operates in the configuration for heating the compartment, as in the third operating mode, and the other circuit operates in the third heating and storage configuration.

In that case, the compartment is heated more than in the third operating mode, but the heat storage liquid is heated less than in that third operating mode.

A fifth operating mode is used when the demand for heat in the compartment is even lower.

In that fifth operating mode, only one of the two primary 12 or secondary 12' heat pump circuits is in the third heating and storage configuration, and the other circuit is deactivated, in particular by closing its compressor.

In a sixth operating mode, the two heat pump circuits 12, 12' are deactivated, the compartment then being heated only by the heat storage reservoir 46.

In that case, the corresponding ventilation device 62 is activated so that the heat storage liquid gives its heat to the air in the compartment.

This sixth operating mode can only be used when the heat storage liquid has been heated beforehand, for example by one of the third to fifth operating modes previously described.

In a seventh operating mode, the heat stored in the reservoir 46 is delivered in parallel with the heating of the compartment by one, the other or both of the heat pump circuits.

An eighth operating mode corresponds to the defrosting of one of the second outside exchangers 18, 18', without the heat being taken from the air of the compartment.

In this eighth operating mode, the circuit 12, 12' whereof the second heat exchanger 18, 18' requires defrosting operates in the fifth cold storage configuration. In other words, the refrigerant takes heat from the storage reservoir 46, rather than from the air in the compartment, and gives that heat back to said second heat exchanger 18, 18', thereby making it possible to defrost it.

At the same time, the other heat pump circuit 12, 12' operates in the first configuration for heating the compartment, as previously described. Thus, the thermal comfort in the compartment is identical to that which would be obtained with a traditional air conditioning device comprising only one heat pump circuit in the heating configuration.

It should be noted that during defrosting, the ventilation devices 15, 19 of the first 14 and second 18 heat exchangers are deactivated. In fact, it is not desirable to ventilate in the compartment during defrosting, so as to avoid producing a sensation of heat felt by the occupants of the compartment. Furthermore, it is not desirable to ventilate to the outside, in order to avoid dissipation of the heat provided to the second heat exchanger, and to ensure that that heat is only used for defrosting.

Alternatively, in a ninth operating mode, in order to accelerate defrosting, said other heat pump circuit 12, 12' can operate in a second heat storage configuration or third heating and storage configuration, based on whether heating of the compartment or efficiency of the defrosting is the priority.

Thus, the heat storage liquid is heated, and the efficiency of the heat pump circuit taking heat from that storage liquid for defrosting of its second heat exchanger 18, 18' is improved.

The air conditioning device 10 also allows cooling of the air in the compartment. In fact, owing to the inversion device 32, each heat pump circuit is reversible.

Thus, in a tenth operating mode, when the demand for cooling of the compartment is high, the two heat pump circuits 12, 12' can both operate in the configuration for cooling the compartment.

Alternatively, in an eleventh operating mode, only one of these circuits 12, 12' operates in the configuration for cooling the compartment, while the other operates in the cold storage configuration.

Alternatively, in a twelfth operating mode, only one of the circuits 12, 12' operates in the configuration for cooling the compartment, while the other operates in the sixth configuration for cooling and cold storage.

In a thirteenth operating mode, only one of the circuits 12, 12' is in the sixth cooling and cold storage configuration, while the other circuit is deactivated.

In a fourteenth operating mode, one, the other or both of the heat pump circuits 12, 12' operates in the configuration for cooling the air of the compartment, and the ventilation device of the storage reservoir 46 is activated so that the storage liquid also takes heat from the air of the compartment. This operating mode can only be used when the heat storage liquid has been cooled beforehand, in particular by one of the eleventh to thirteenth operating modes previously described.

Alternatively, in a fifteenth operating mode, both circuits 12, 12' are deactivated, for example for energy-saving reasons, and only the ventilation device of the reservoir 46 is activated, so that the storage liquid takes heat from the air in the compartment. This operating mode can only be used when the heat storage liquid has been cooled beforehand, in particular by one of the eleventh to thirteenth operating modes previously described.

In a sixteenth operating mode, the ventilation devices 15, 15' that are connected to the first heat exchangers 14, 14' are activated while the two heat pump circuits 12, 12' are deactivated, in order to perform a ventilation function in the compartment. Such a ventilation function can be used alone, or in combination with the activation of the ventilation device of the reservoir 46 as in the fifteenth operating mode previously described.

It will be noted that the invention is not limited to the described embodiment and may have various alternatives without going beyond the scope of the claims.

In particular, the air conditioning device 10 could comprise more than two heat pump circuits, all connected to the same storage reservoir 46.

Furthermore, other operating modes could be considered, in particular when the air conditioning device 10 comprises more than two heat pump circuits.

The invention claimed is:

1. An air conditioning device for a compartment, said air conditioning device comprising:
  a primary heat pump circuit, comprising at least one first primary heat exchanger with the air from the compartment, a primary compressor, a second primary heat exchanger with the outside air, and a primary expander device,
  a secondary heat pump circuit, comprising a first secondary heat exchanger with the air from the compartment, a secondary compressor, a second secondary heat exchanger with the air from the outside, and a secondary expander device,
  a heat storage reservoir, connected to the primary heat pump circuit, in parallel with said first primary heat exchanger with the air from the compartment, and connected to the secondary heat pump circuit, in parallel with said first secondary heat exchanger with the air from the compartment.

2. The air conditioning device according to claim 1, wherein the heat storage reservoir comprises:
  an enclosure filled with a heat storage fluid,
  a first hollow heat exchange element, housed in the enclosure, and communicating with the primary heat pump circuit, and
  a second hollow heat exchange element, housed in the enclosure, and communicating with the secondary heat pump circuit.

3. The air conditioning device according to claim 1, wherein the primary heat pump circuits comprises:
  a first primary branch, connected to the first primary heat exchanger,
  a second primary branch, extending between the first primary heat exchanger and the primary expander device,
  a third primary branch, extending between the primary expander device and the second primary heat exchanger,
  a fourth primary branch, connected to the second primary heat exchanger,
  a primary compressor branch, on which the primary compressor is arranged, and extending between a primary inlet part and a primary outlet part,
  a primary inversion device, able to alternate between connecting said primary inlet portion to the first primary branch and said primary outlet portion to the fourth primary branch, and connecting said primary inlet part to the fourth primary branch and said primary outlet part to the first primary branch,
  and the secondary heat pump circuits comprises:
  a first secondary branch, connected to the first secondary heat exchanger,
  a second secondary branch, extending between the first secondary heat exchanger and the secondary expander device,
  a third secondary branch, extending between the secondary expander device and the second secondary heat exchanger,
  a fourth secondary branch, connected to the second secondary heat exchanger,
  a secondary compressor branch, on which the secondary compressor is arranged, and extending between a secondary inlet part and a secondary outlet part, a secondary inversion device, able to alternate between connecting said secondary inlet portion to the first secondary branch and said secondary outlet portion to the fourth secondary branch, and connecting said secondary inlet part to the fourth secondary branch and said secondary outlet part to the first secondary branch.

4. The air conditioning device according to claim 3, wherein the primary inversion device comprises:
a first primary three-way valve, having a first path connected to said first primary branch, a second path connected to said primary inlet part, and a third path connected to said fourth primary branch, and
a second primary three-way valve, having a first path connected to said first primary branch, a second path connected to said primary outlet part, and a third path connected to said fourth primary branch.

5. The air conditioning device according to claim 3, wherein the secondary inversion device comprises:
a first secondary three-way valve, having a first path connected to said first secondary branch, a second path connected to said secondary inlet part, and a third path connected to said fourth secondary branch, and
a second secondary three-way valve, having a first path connected to said first secondary branch, a second path connected to said secondary outlet part, and a third path connected to said fourth secondary branch.

6. The air conditioning device according to claim 3, wherein the primary expander device comprises a first primary expander supported by a first primary expander branch, and a second primary expander supported by a second primary expander branch, such that:
the first primary expander has an inlet connected to said second primary branch, and an outlet connected to said third primary branch,
the second primary expander has an inlet connected to said third primary branch, and an outlet connected to said second primary branch,
the first primary expander branch comprises a first primary check valve, arranged in series with the first primary expander, and oriented in the same direction as that first primary expander, and
the second primary expander branch comprises a second primary check valve, arranged in series with the second primary expander, and oriented in the same direction as that second primary expander.

7. The air conditioning device according to claim 3, wherein the secondary expander device comprises a first secondary expander supported by a first secondary expander branch, and a second secondary expander supported by a second secondary expander branch, such that:
the first secondary expander has an inlet connected to said second secondary branch, and an outlet connected to said third secondary branch,
the second secondary expander has an inlet connected to said third secondary branch, and an outlet connected to said second secondary branch,
the first secondary expander branch comprises a first secondary check valve, arranged in series with the first secondary expander, and oriented in the same direction as that first secondary expander, and
the second secondary expander branch comprises a second secondary check valve, arranged in series with the second secondary expander, and oriented in the same direction as that second secondary expander.

8. The air conditioning device according to claim 3, wherein:

the heat storage reservoir comprises an enclosure filled with a heat storage fluid, a first hollow heat exchange element, housed in the enclosure, and communicating with the primary heat pump circuit, and a second hollow heat exchange element, housed in the enclosure, and communicating with the secondary heat pump circuit,
the first hollow heat exchange element is connected on the one hand to said first primary branch of the primary heat pump circuit by means of a first primary conduit, and on the other hand to said second primary branch of the primary heat pump circuit by means of a second primary conduit, and
the second hollow heat exchange element is connected on the one hand to said first secondary branch of the secondary heat pump circuit by means of a first secondary conduit, and on the other hand said second secondary branch of the secondary heat pump circuit by means of a second secondary conduit.

9. The air conditioning device according to claim 8, wherein:
the first primary conduit is connected to the first primary branch of the primary circuit at a first primary branching,
the second primary conduit is connected to the second primary branch of the primary circuit at a second primary branching,
the first primary branch of the primary circuit comprises a first primary valve arranged between said first primary branching and the first primary exchanger, and
one of the first primary conduit and second primary conduit comprises a second primary valve.

10. The air conditioning device according to claim 8, wherein:
the first primary conduit is connected to the first primary branch of the primary circuit at a first primary branching,
the second primary conduit is connected to the second primary branch of the primary circuit at a second primary branching,
the second primary branch of the primary circuit comprises a first primary valve arranged between said second primary branching and the first primary exchanger, and
one of the first primary conduit and second primary conduit comprises a second primary valve.

11. The air conditioning device according to claim 8, wherein:
the first secondary conduit is connected to the first secondary branch of the secondary circuit at a first secondary branching,
the second secondary conduit is connected to the second secondary branch of the secondary circuit at a second secondary branching,
the first secondary branch of the secondary circuit comprises a first secondary valve arranged between said first secondary branching and the first secondary exchanger, and
one of the first secondary conduit and second secondary conduit comprises a second secondary valve.

12. The air conditioning device according to claim 8, wherein:
the first secondary conduit is connected to the first secondary branch of the secondary circuit at a first secondary branching, the second secondary conduit is connected to the second secondary branch of the secondary circuit at a second secondary branching, the second secondary branch of the secondary circuit comprises a first secondary valve arranged between said second secondary branching and the first secondary exchanger, and one of the first secondary conduit and second secondary conduit comprises a second secondary valve.

13. The air conditioning device according to claim 1, where said heat storage reservoir is able to exchange heat with the air in the compartment, the heat storage reservoir being equipped with a ventilation device able to generate a flow of air passing through the storage reservoir.

14. The air conditioning device according to claim 1, wherein at least one of the first or second primary or secondary heat exchangers is equipped with a ventilation device able to generate a flow of air passing through that first or second primary or secondary heat exchanger.

15. A method for defrosting a second heat exchanger of a heat pump circuit of an air conditioning device comprising:
the heat pump circuit, comprising at least one first heat exchanger with the air from the compartment, a compressor, the second heat exchanger with the outside air, and an expander device, and another heat pump circuit, comprising a first other heat exchanger with the air from the compartment, another compressor, a second other heat exchanger with the air from the outside, and another expander device, a heat storage reservoir, connected to the heat pump circuit, in parallel with said first heat exchanger with the air from the compartment, and connected to the other heat pump circuit, in parallel with said secondary heat exchanger with the air from the compartment, wherein:

the heat pump circuit comprising the second heat exchanger to be defrosted, operates in a cold storage configuration, in which a refrigerant circulating in that heat pump circuit withdraws heat from the storage reservoir and gives that heat back to the second heat exchanger to be defrosted, the other heat pump circuit operates in a heating configuration of the compartment, in which a refrigerant circulating in that circuit withdraws heat from the second other heat exchanger of that other heat pump circuit and gives that heat back to the first other heat exchanger of that other heat pump circuit.

16. The defrosting method according to claim 15, wherein said other heat pump circuit operates in a configuration for heating the compartment and storing heat in the storage reservoir, in which a refrigerant circulated in that other heat pump circuit withdraws heat from the second other heat exchanger of that other heat pump circuit and gives the heat back on the one hand to the first other heat exchanger of that other heat pump circuit, and on the other hand to the storage reservoir.

17. A railway vehicle having a compartment, and having an air conditioning device for the compartment, said air conditioning device comprising:
a primary heat pump circuit, comprising at least one primary heat exchanger with the air from the compartment, a primary compressor, a second primary heat exchanger with the outside air, and a primary expander device, a secondary heat pump circuit, comprising a first secondary heat exchanger with the air from the compartment, a secondary compressor, a second secondary heat exchanger with the air from the outside, and a secondary expander device, a heat storage reservoir, connected to the primary circuit, in parallel with said primary heat exchanger with the air from the compartment, and connected to the secondary circuit, in parallel with said first secondary heat exchanger with the air from the compartment.

* * * * *